(12) United States Patent
Rembe et al.

(10) Patent No.: US 7,518,101 B2
(45) Date of Patent: Apr. 14, 2009

(54) SCANNING MICROSCOPE FOR OPTICALLY MEASURING AN OBJECT

(75) Inventors: Christian Rembe, Waldbronn (DE); Bernd Armbruster, Karlsruhe (DE)

(73) Assignee: Polytec GmbH, Waldbronn (DE)

( * ) Notice: Subject to any disclaimer, the term of this patent is extended or adjusted under 35 U.S.C. 154(b) by 0 days.

(21) Appl. No.: 11/762,160

(22) Filed: Jun. 13, 2007

(65) Prior Publication Data

US 2007/0291280 A1 Dec. 20, 2007

(30) Foreign Application Priority Data

Jun. 19, 2006 (DE) ................... 10 2006 028 409

(51) Int. Cl.
*G02B 21/00* (2006.01)
*G01B 11/24* (2006.01)
*G01B 9/02* (2006.01)
*H01J 3/14* (2006.01)

(52) U.S. Cl. .............. 250/234; 359/370; 359/385; 359/389; 359/393

(58) Field of Classification Search .......... 250/234, 250/235; 348/79; 359/368, 370, 379, 383, 359/358, 389, 391, 392, 393
See application file for complete search history.

(56) References Cited

U.S. PATENT DOCUMENTS

| 5,674,743 | A | | 10/1997 | Ulmer | |
| 5,866,911 | A | * | 2/1999 | Baer | 250/458.1 |
| 5,936,764 | A | * | 8/1999 | Kobayashi | 359/385 |
| 6,914,238 | B2 | * | 7/2005 | Engelhardt et al. | 250/234 |
| 6,943,823 | B2 | * | 9/2005 | Valentin et al. | 348/87 |
| 2002/0167659 | A1 | * | 11/2002 | Valentin et al. | 356/237.1 |
| 2002/0179828 | A1 | * | 12/2002 | Engelhardt et al. | 250/234 |
| 2005/0122579 | A1 | | 6/2005 | Sasaki | |

(Continued)

FOREIGN PATENT DOCUMENTS

DE 19841365 4/2000

(Continued)

OTHER PUBLICATIONS

Preusser, Tobias and Rumpf, Martin, "Extracting Motion Velocities from 3D Image Sequences and Coupled Spatio-Temporal Smoothing", SPIE Conferences on Visualization and Data Analyses, SPIE vol. 5009, 2003, pp. 181-192.

(Continued)

*Primary Examiner*—John R Lee
(74) *Attorney, Agent, or Firm*—Volpe and Koenig, P.C.

(57) ABSTRACT

A scanning microscope for the optical measuring of an object in which a measurement beam emitted by the light source impinges the object and is reflected by the object as a reflection beam that reenters through the lens into the radiation path of the microscope. A scanner control unit controls a displacement to change the relative position of the object and the measuring beam so that the beam is directed to at least two different measuring points on the object. An excitation unit periodically excites the object. The reflection beam is visualized on a signal detector, and a signal storage unit saves a measuring sequence of signals of the signal detector. The scanner control unit cooperates with the excitation and signal storage units to control them such that for each measuring point on the object at least one measuring sequence of measuring signals of the signal detector is saved.

13 Claims, 2 Drawing Sheets

U.S. PATENT DOCUMENTS

2007/0081234 A1* 4/2007 Widzgowski ............... 359/385
2007/0291280 A1* 12/2007 Rembe et al. ............... 356/516

FOREIGN PATENT DOCUMENTS

| | | |
|---|---|---|
| DE | 10005852 | 8/2001 |
| DE | 10126286 | 12/2002 |
| EP | 1610088 | 6/2004 |
| WO | 0219594 | 3/2002 |

OTHER PUBLICATIONS

Alvarez, Luis, Weickert, Joachim and Sanchez, Javier, "A Scale-Space Approach to Nonlocal Optical Flow Calculations", Scale-Space 1999, Corfu, Greece, Sep. 1999, Lecture Notes in Computer Science; 1682, pp. 235-246.

Rembe, C., Draebenstedt, A., "The Laser-Scanning Confocal Vibrometer Microscope", SPIE 5856, (2005), pp. 698-709.

* cited by examiner

SCANNING MICROSCOPE FOR OPTICALLY MEASURING AN OBJECT

BACKGROUND

The invention relates to a scanning microscope for optically measuring an object.

Such a scanning microscope comprises a lens, a light source, a displacement unit, and a scanner control unit. The light of the light source is visualized in form of a measuring beam on the object to be scanned via the radiation path of the microscope, which typically is provided with additional lenses, beam splitters, and deflecting mirrors, through the lens. The measuring beam is reflected by the object and reentering the radiation path of the scanning microscope in form of a reflection beam via the lens into. In the scanning microscope the reflection beam is typically visualized on an image display unit.

In the simplest case the image display unit is embodied as an eye-piece, through which the observer can look at the image of the measuring point on the object. Frequently, the image display unit is embodied as a camera and/or a camera with a connected evaluation unit, though, so that a camera image can be saved.

The scanner control unit is connected to the displacement unit and sends control signals thereto such that the relative position of the object to be measured and the measuring beam can be changed.

A typical displacement unit is embodied as an X-Y-table, which, depending on the signals of the object emitted by the scanner control unit, can essentially displace the object perpendicularly to the X-direction or the Y-direction. In this manner it is achieved that the measuring beam can be pointed to different predetermined, locally different measuring points on the object so that different measuring points can be measured.

However, the displacement unit can also be arranged in the radiation path of the microscope and affect the measuring beam such that it is deflected and thus it can be directed to locally different, predetermined measuring points on the object. A displacement unit can be realized, for example, by controlled rotary mirrors in the radiation path of the scanning microscope.

Using a scanning microscope it is therefore possible to light several locally different measuring points on the object by the measuring beam and to save the image for each measured point using the reflecting beam on the image display unit, such as a camera.

The measuring point on the object to be measured is beneficially located approximately in the focal area of the microscope during the measurement, so that the measuring beam at the measuring point has an extension as little as possible and thus an area on the object as small as possible is lit, allowing a high local resolution.

SUMMARY

The present invention is based on the object to improve a scanning microscope of the type mentioned at the outset, which also allows measurement of movements of the object, in particular both movements, which run essentially perpendicular to the measuring beam, as well as movements, which essentially run parallel to the measuring beam. The expansion of the scope of functions of the scanning microscope shall here be achieved in a technologically simple manner and thus cost-effectively.

This object is attained in a scanning microscope for the optical measurement of an object according to the invention. Advantageous embodiments of the scanning microscope according to the invention are descried below.

The invention is fundamentally different from the technology of prior art in that the scanning microscope further comprises a signal detector and a signal storage unit, with several consecutive measuring signals of the signal detector are saved in the signal storage unit for each measurement point on the object.

The signal detector is arranged in the radiation path of the scanning microscope. Here, the scanning microscope is embodied such that the reflection beam, i.e. the measuring beam reflected by the object, is visualized on the signal detector.

The signal storage unit is connected to the signal detector and embodied such that measuring signals of the signal detector can be saved by the signal storage unit. The signal storage unit is here embodied such that measurement sequences of signals of the signal detector, i.e. consecutive signals of the signal detector, are saved.

The scanner control unit is connected to the signal storage unit, so that it can be controlled by the scanner control unit.

The control by the scanner control unit occurs such that for each measuring point on the object at least one measuring sequence of measuring signals of the signal detector is saved. Here, a measuring sequence comprises at least two measuring signals of the signal detector. The signals may be signals immediately following each other or a measurement pause of a predetermined duration may pass between the signals.

The scanning microscope according to the invention is therefore characterized in that the measuring beam reflected by the moving object is detected by a signal detector, with its measuring signals being saved for each measuring point on the object by the signal control unit in a time-resolved manner.

After several differently located measuring points on the object have been measured by the scanning microscope according to the invention, a measurement sequence is therefore saved in the signal storage unit for each of these measuring points, from which conclusions can be drawn for the movement of each measured point on the object.

The movement of the object can here be the result of different causes:

Typical objects to be measured in micro system technology have a control input, through which the control signals can be received for exciting the object. The excitement occurs in this case via an external exciting unit, which sends periodically exciting signals to the object to be measured. Instead of the control input the exciting signal may also be transmitted from the exciting unit to the object by different manners, such as e.g., acoustical or light impulses.

Similarly, the excitation may also occur by the object itself by object-immanent exciting mechanisms. Typically such objects are provided with a signal output, at which a synchronizing signal (trigger signal) synchronized to the excitation can be tapped. It is also possible to receive the trigger signal by measuring the object, e.g., by an optic measuring of a defined point on the object.

It is essential that a synchronized, periodic synchronization signal for exciting the object can be tapped, either from an excitation unit of from the object to be measured itself.

Therefore, the scanner control unit advantageously includes a synchronization input, in which the synchronization signal for synchronizing the excitation can be fed. The scanner control unit is embodied such that it controls the signal storage unit depending on the synchronization signal such that excitation and input of measurement data are synchronized.

Synchronization means here, that the measurement sequences saved by the signal unit for each measurement point are approximately at the same phase as the synchronization signal and thus the excitation of the object:

When for example for the first measurement point on the object the first measurement signal of the detector is saved for the first measurement sequence at the beginning of the excitation of the object, the synchronization causes the first measuring signal of the detector to be also saved for the second measurement point on the object for the second measuring sequence beginning with the excitation of the object by the exciting unit. The measuring data for the first saved measurement signal of the first measuring sequence and the first saved measuring signal of the second measuring sequence are therefore of the same phase with regard to the periodic excitation. The same applies to the other measuring points and measurement sequences.

By the synchronized control, the reconstruction of the movement of the object is considerably facilitated, because now it is ensured that the movement of a point on the object measured in the measuring sequence with regard to the excitation has no temporal shift, i.e. phase shift in reference to the measurements of the movements of the other points on the object saved in the other measurement sequences.

Advantageously, the scanner control unit controls the signal storage unit such that a measurement sequence comprises at least the measurement signals of the signal detector during one excitation period. Thus, the movement of a measuring point during an entire excitation spectrum is saved in the measurement sequence. If the periodic excitation leads to a periodic movement in the object measured, which result in periodic movements of different lengths in the temporal aspect in reference to the periodic excitation it is advantageous to select the measurement sequences such that at least one period of the periodic movements of the measuring point is stored by the measurement sequences saved.

The time covering one measurement sequence results from the number of saved measurement signals per measuring sequence and the temporal density, by which the measurement signals of the signal detector are saved.

Advantageously, the measurement signals are saved in equally long intervals so that a scanning frequency (sample rate) can be stated, by which the measurement signals in a measurement sequence are saved.

The above stated condition that a measurement sequence comprises at least one excitation or movement period can e.g., be fulfilled by predetermining a scanning frequency and a duration time, which measurement signals are saved for a measurement sequence. Additionally, it is possible to preset the scanning frequency and a number of measurement signals to be saved.

Particularly, for the measurement of the movement of small objects, in particular the movements or oscillations of miniaturized parts in micro-system technology, the above-described scanning microscope according to the invention are suitable, because by the measuring beam focused onto the measuring object by the microscope has an appropriately small area when impinging the measuring object so that locally high resolutions are possible.

In order to measure the movements of such objects it is advantageous to save measurement signals with a scanning frequency of at least 1 kHz, in particular of at least 100 kHz, in order to allow the resolution of fast movements with a sufficient precision as well.

In order to evaluate the measurement data saved in the signal storage unit, it is advantageous when the microscope is further provided with an evaluation unit, which is connected to the signal storage unit. This evaluation unit is embodied such that it allocates the measurement signals depending on the signal value of different brightness and/or color values. This way, a movement film of the object to be measured can be illustrated by first sequentially showing all first measurement signals of a measurement sequence is on a flat display, such as for example a monitor, and then all second measurement signals etc.

For an analysis of the movement of the object it is advantageous when the movement is not only optically shown by a moving film but additionally by determining quantitative information concerning the movement of the object. This can be achieved by determining the speed and/or direction of the movement of a measuring point on the object in the measuring plane (in-plane), i.e. perpendicular in reference to the measurement beam. Additionally, the determination of the in-plane movement amplitude of a measuring point is beneficial for the quantitative evaluation of the movement.

Advantageously, the evaluation unit is embodied such that it correlates the measuring sequences for the different measuring points to each other such that the speed, the direction, and/or the amplitude of the movement are determined from the measuring sequences saved in the signal storage unit for at least one measuring point. In order to determine this quantitative information of the movement from the measuring data, here, known processes can be used for analyzing in-plane movements, such as for example T. Preusser, M. Rumpf, "Extracting Motion Velocities from 3D Image Sequences and Coupled Spatio-Temporal Smoothing", SPIE Conferences on Visualization and Data Analyses, SPIE Vol. 5009, 2003, pages 181-192 and L. Alvarex, J. Weickert, J. Sanchez, "A scale-space approach to nonlocal optical flow calculations", Scale-Space 1999, Corfu, Greece, Sep. 1999, Lecture Notes in Computer Science; 1682, pages 235-246, Springer 1999, which are incorporated by reference herein as if fully set forth.

The increase of the precision of the measurement can be achieved such that non-focal radiation is filtered out, entering from points outside the focus of the lens. The scanning microscope according to the invention is therefore advantageously embodied as a confocal scanning microscope, which is provided with a spatial filter. This spatial filter is arranged in the radiation beam of the scanning microscope such that the described non-focal radiation is essentially filtered out. Typically the filtering out is implemented by a spatial filter in the form of a pinhole.

Using the above-described scanning microscope movements of the object can be measured, which occur essentially perpendicular in reference to the measurement beam (in-plane movements). However, frequently three-dimensional movements occur, i.e. movements which are not only in one plane but also have movement portions perpendicular in reference to the in-plane plane, for example. Such movement portions (out-of plane movements), which essentially occur parallel in reference to the measuring signal, can also be measured by an advantageous embodiment of the scanning microscope according to the invention.

In this advantageous embodiment the scanning microscope is additionally provided with a focusing device, which is embodied such that it can additionally change the distance between the object and the focal plane of the lens.

The focusing device can be embodied for example such that it changes the focus of the lenses by displacing them such that the lens is moved in reference to the object or that the object itself is moved in reference to the lens.

It is essential that the distance between the object and the focal plane of the object can be predetermined by control signals to the focusing device.

This way it is possible to sequentially perform the above-described measurements in several different planes.

Initially a first distance is predetermined by the scanner control unit between the object and the focal plane of the lens and subsequently a scanning measuring of the predetermined points is performed on the object in said measurement plane. For each measurement point a measuring sequence of measurement signals embodied as described above is saved in the signal storage unit.

Subsequently the scanner control unit controls the focusing device such that a second predetermined distance is adjusted between the object and the focus plane and thus a second measuring plane. Now measurements are also performed for said second distance at the predetermined measuring points, as described above.

As a result, for each predetermined measuring point and for each predetermined measuring plane (i.e. for each predetermined distance between the object and the focusing plane of the object) one measuring sequence of measuring signals each is yielded.

In order to display the measuring data it is also advantageous in this embodiment of the scanning microscope when the scanning microscope is provided with an evaluation unit, which correlates the individual measuring sequences for the different measuring points and measuring planes with each other.

By a correlation of these measuring data not only an evaluation of the in-plane movement is possible but also an evaluation of the out-of plane movement, which essentially occurs perpendicular in reference to the measuring beam. The quantitative evaluation of the movement, in particular the speed, direction, and amplitude of movements can occur by correlation methods known per se (e.g., Pattern-Matching Algorithms), such as for example described in T. Preusser, M. Rumpf (l.s.), which is incorporated by reference herein as if fully set forth.

In order to achieve a simple evaluation of the movement data it is advantageous when not only the data of individual measuring points of a measuring plane are collected in a synchronized fashion but also a synchronization of the measurements occurs for the various measuring planes. In this case all measured measuring sequences are in a fixed phase ratio in reference to the periodic excitation.

The described advantageous embodiment of the scanning microscope with added focusing requirements represents a simple and cost-effective possibility to measure three-dimensional movements of an object using a scanning microscope.

However, the scope of the invention also includes measuring the three-dimensional movements of a measuring point using an interferometer.

In this advantageous embodiment, the scanning microscope is provided with an interferometer, which is arranged in the radiation beam of the scanning microscope such that the interferometer-measuring beam (emitted by the interferometer) is displayed on the measuring point of the object via the lens. The interferometer-measuring beam reflected from the object is displayed as an interferometer-reflection beam into the interferometer, again via the lens and the radiation path of the microscope, such that the movement of the measuring point on the object can be determined parallel to the interferometer-measuring beam by an interferometer-evaluation unit, based on the interference of the interfering radiation in a manner known per se using a detector.

The interferometer-evaluation unit is connected to the signal storage unit so that for each measuring point on the object, in addition to the measuring sequence of the measuring signals of the signal detector, the movement data of the out-of plane movement can be saved for this measuring point using the interferometer-evaluation unit.

In this embodiment of the scanning microscope according to the invention only one scanning process needs to be performed for the predetermined measuring points on the object in order to measure the three-dimensional movement of the object. Additional processes with a changed measuring plane, as necessary in the previously described advantageous embodiment, can be omitted here, so that a considerable faster measuring is possible.

The interferometer is advantageously embodied as a heterodyne interferometer, in which two optic waves with slightly different frequencies are interfered. This is typically achieved in that an acoustical-optical modulator is inserted into the interferometer so that the frequency of an optic wave is shifted.

Thus, on the interferometer detector a signal is created with the difference frequency of the two optic waves (the so-called heterodyne-frequency) so that, in a known manner, not only the speed of the movement of the measuring point to be measured can be determined parallel to the measuring beam from the signals of the interferometer-detector but also the direction of the movement.

In this advantageous embodiment the signal created on the interferometer-detector can also be used as a measuring signal for the measuring sequences. From the signal of the interferometer detector, depending on the intensity of the signal, conclusions can be drawn on the light-intensity of the reflected interferometer-measuring beam. The calculation of the light intensity from the signal of the interferometer can here occur via methods known per se, such as e.g., described in C. Rembe, A. Draebenstedt, "The Laser-Doppler Confocal Vibrometer Microscope", SPIE 5856, (2005), pages 698-709, which is incorporated by reference herein as if fully set forth.

The light intensity calculated this way can be used as a measuring signal for the measuring sequences so that in this case the interferometer-detector can simultaneously be used as a signal detector. The determined light intensity is saved by the signal storage unit, as described above, in form of measuring sequences for each measuring point.

Therefore, in the above-described advantageous embodiment both the movement information as well as the information of the light intensity is yielded from the signal of the interferometer. This results in additional advantages:

On the one hand, the interferometer serves both as a detector as well as a light source, because the interferometer-measuring beam created by the interferometer is used to detect all measuring data using the signals of the interferometer-detector. The scanning microscope is therefore easily designed because only one interferometer is used, however its measuring signals are evaluated in multiple aspects.

Furthermore, the intensity signal is yielded from the interferometer-measuring signal so that the intensity determination is based on an interference of the radiation interfered in the interferometer. This way, a higher measuring accuracy and higher stability is possible for the determination of the intensity signal.

BRIEF DESCRIPTION OF THE DRAWINGS

In the following exemplary embodiments of the invention are explained and described in greater detail using the attached drawings. Here, shown are.

DETAILED DESCRIPTION OF THE PREFERRED EMBODIMENTS

Figure 1:
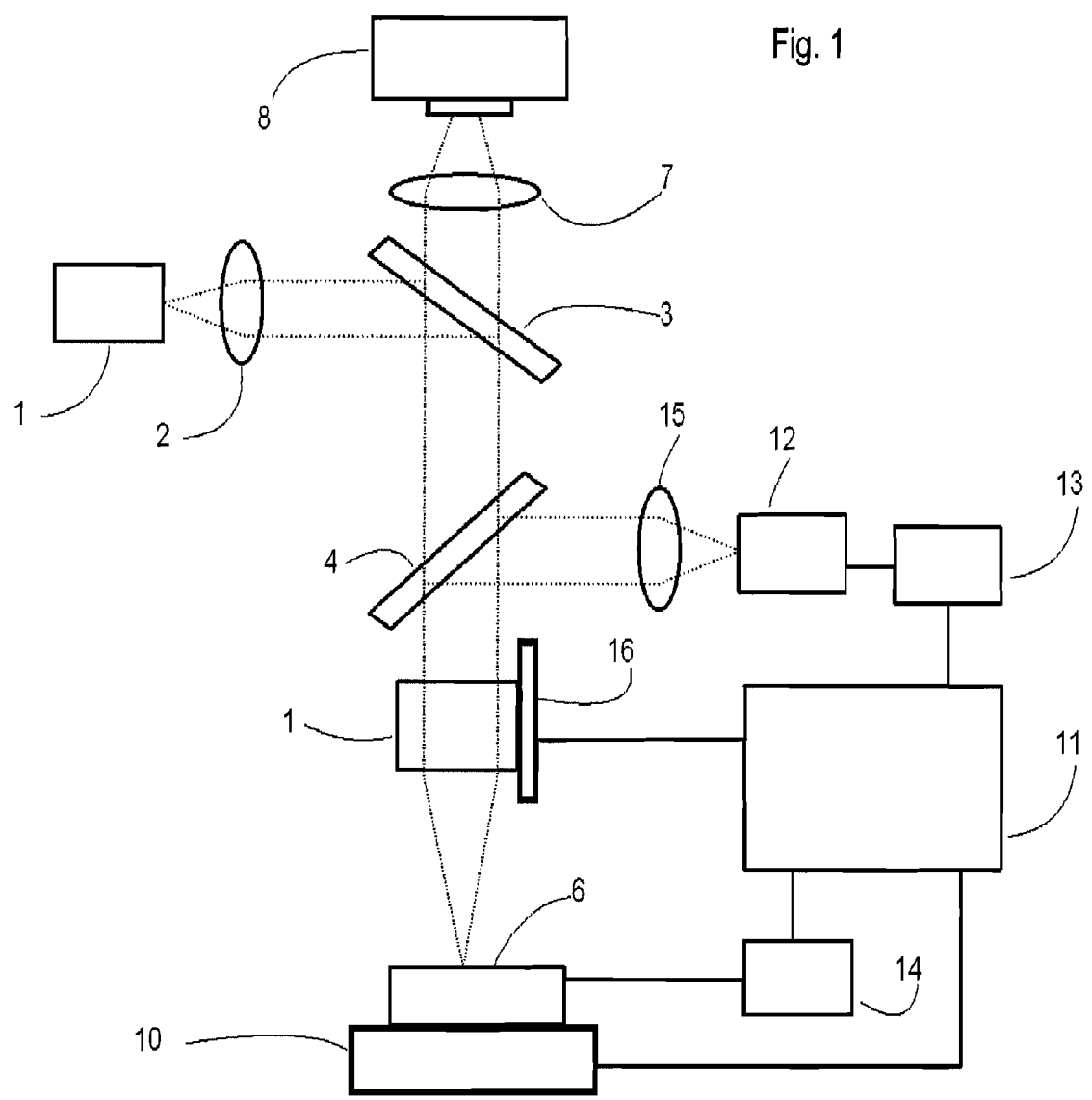
FIG. 1 a schematic view of a scanning microscope according to the invention, comprising a focusing device, and FIG. 2 a schematic view of a scanning microscope according to the invention comprising a focusing device and an interferometer.

The scanning microscope shown in FIG. 1 includes a light source 1, with its light beam being visualized on an object 6 to be measured via a first lens 2, a first beam splitter 3, a second beam splitter 4, and a lens 5. The light beam of the light source 1 reflected by the object 6 is visualized as the reflection beam on an image display unit embodied as a camera 8 via the lens 5, the second beam splitter 4, the first beam splitter 3, and the second lens 7.

The object 6 is supported on a displacement unit 10, which is connected to a scanner control unit 11. The displacement unit 10 is embodied as a X-Y-table so that the object 6 can be essentially displaced perpendicular to the measuring beam in both directions, i.e. in the representation in FIG. 1 to the right and the left and out of the image plane and into said plane.

Similarly it is also possible, instead of the X-Y-table to embody the displacement unit as an arrangement of scanner mirrors, which are arranged in the radiation path of the microscope such that the measuring beam can be directed to several predetermined, locally different measuring points on the object.

The displacement unit 10 is controlled by the scanner control unit 11.

It is now essential that the scanning microscope is further provided with a signal detector 12, a signal control unit 13, and an exciter unit 14. The measuring beam reflected by the object is visualized on the signal detector 12 as a reflection beam, after it has passed the lens 5, the second beam splitter 4, and a third lens 15. The signal detector measures the light intensity of the measuring beam and forwards respective signals to the signal storage unit 13.

The scanner control unit 11 is connected to the signal storage unit 13 and the exciter unit 14. The exciter unit 14 in turn is connected to the object 6, so that it can periodically be excited by the excitation unit 14.

The scanner control unit 11 controls the displacement unit 10 and the signal storage unit 13 depending on the synchronization signals received from the excitation unit 14 such that for each predetermined measuring point in the signal storage unit a measuring sequence is saved with a predetermined number of measuring points. The measuring points are here detected in a predetermined scanning frequency.

Subsequently the scanner control unit controls the displacement unit 10 such that the next measuring point of the object 6 is impinged by the measuring beam. For this measuring point a measuring sequence is then detected and saved in the signal storage unit in the same manner.

During the measuring, the scanner control unit 11 synchronizes the signal storage device 13 depending on the synchronization signals received from the excitation unit 14 so that each measuring sequence is in the same phase ratio to the exciting period of the excitation unit 14.

Further, in the scanner control unit 11 an evaluation unit (not shown) is integrated, which, after the measuring of all predetermined measuring points on the object has occurred, performs an evaluation of the measuring data saved in the signal storage unit 13 such that a movement film of the in-plane movement of the measuring object 6 is created.

The scanning microscope shown in FIG. 1 is further provided with a focusing device 16, which is also connected to the scanner control unit 11. This way it is possible to perform the above-described measuring process for different measuring planes, i.e. for different distances from of the measuring object and the focus plane of the lens. For each predetermined measuring plane the scanner control unit 11 regulates the focusing device such that the lens 5 is displaced into the desired distance from the measuring object 6, i.e. in FIG. 1 accordingly upwards or downwards. Then for each measuring point on the object 6 a measuring sequence each is detected.

Advantageously the scanning microscope shown in FIG. 1 is embodied as a confocal scanning microscope, i.e. it has a pinhole (not shown) in the radiation path of the microscope, which filters out non-focal radiation so that only beams contribute to the measurement originating in the focus area of the lens enter the radiation path of the microscope.

After the conclusion of the measurements, the three-dimensional movements of the measuring points can be reconstructed from the data for the individual measurement points and the individual measurement planes and via pattern-matching algorithms quantitative information can be determined, such as speed, direction, and amplitude of movement for the individual measuring points.

Figure 2:
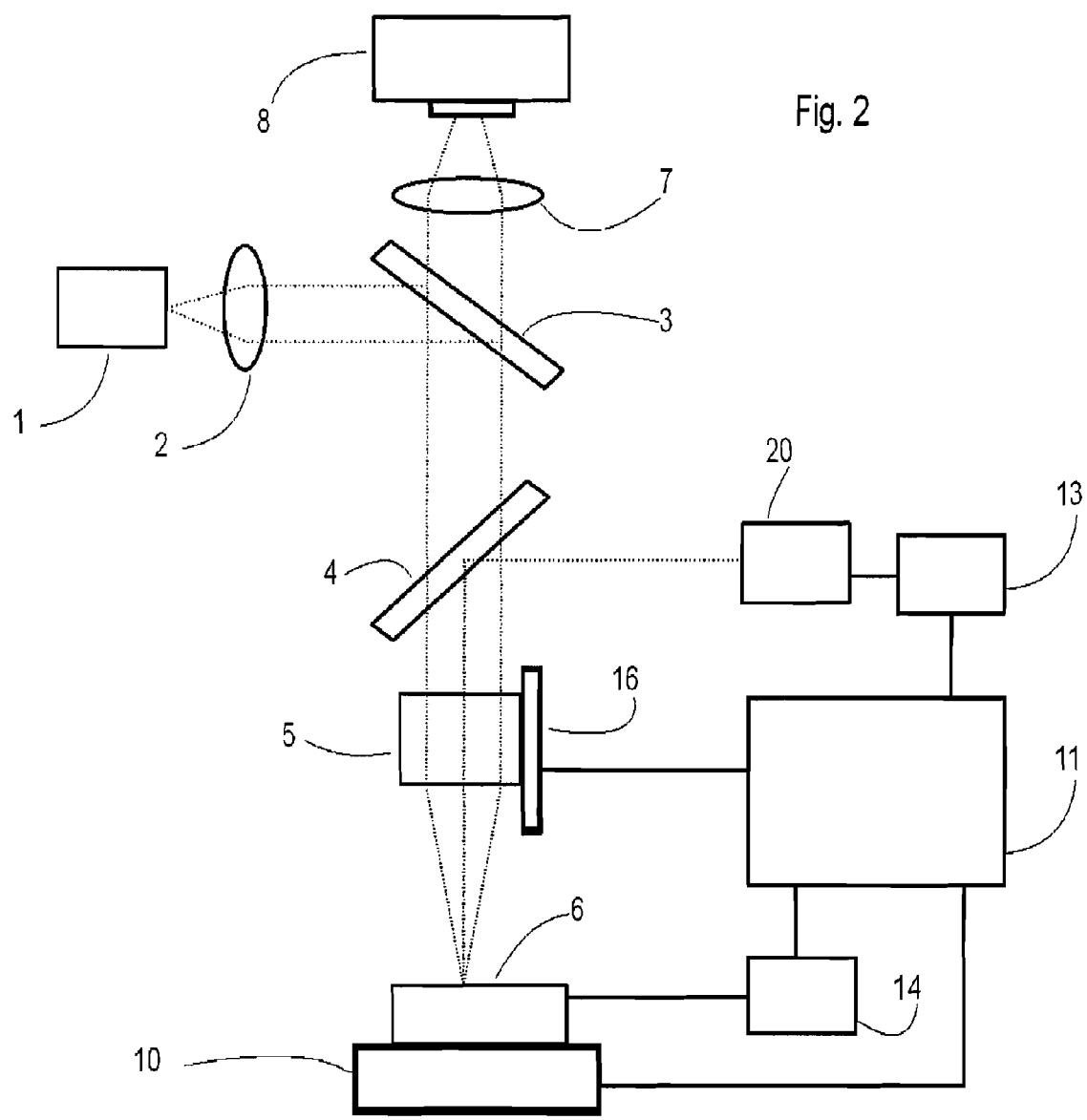

FIG. 2 shows another exemplary embodiment of the scanning microscope according to the invention, which is provided, as already described in FIG. 1, with the element light source 1, first lens 2, first beam splitter 3, second beam splitter 4, lens 5, displacement unit 10, second lens 7, camera 8, scanner control unit 11, focusing device 16, as well as the excitation unit 14.

In contrast to the exemplary embodiment described in FIG. 1, the scanning microscope shown in FIG. 2 is provided with a heterodyne interferometer 20, which is connected to the signal storage unit 13. The heterodyne interferometer 20 emits an interferometer-measurement beam, which impinges the measuring object 6 via the second beam splitter 4 through the lens 5 and the reflecting interferometer-measuring beam once reenters the microscope 5 as an interferometer-reflection beam through the second beam splitter 4 and is displayed on the interferometer 20. In the interferometer 20, the two beams (measuring beam and reflection beam) are interfered on an interferometer-detector. The interferometer 20 comprises an interferometer evaluation unit (not shown), which is connected to a signal storage unit 13 and sends two types of data thereto:

On the one hand, the interferometer-evaluation unit evaluates the data of the interferometer detector regarding the aspect that the out-of plane movement of the measuring point of the object 6 is determined with regard to speed and direction and this data is forwarded to the signal storage unit 13. Furthermore, the interferometer-evaluation unit evaluates the data of the interferometer such that the intensity of the measuring signal is forwarded to the signal storage unit 13. The intensity of the measuring signal is a measure for the intensity of the interferometer-reflection beam reflected by the measuring point on the object 6.

The interferometer evaluation unit is provided with a multi-channel signal evaluation unit for evaluating the measurement data of the interferometer-detector, which simultaneously process the signal for the determination of the out-of plane movement and the signal for determining the light intensity. This way a simple synchronization of the two pieces of information is possible because the data is detected simultaneously.

In the signal control unit 13 both the data mentioned for the out-of-plane movement as well as the intensity data can be saved for each measuring point in a measuring sequence for determining the in-plane movement.

The measuring process is controlled, as already explained in the description of FIG. 1, by the scanner control unit 11.

For measuring the three-dimensional movement using the scanning microscope shown in FIG. 2 only a one-time scanning process of the predetermined measuring points is necessary, while in the scanning microscope shown in FIG. 1 for each measuring plane a scanning process is necessary for the predetermined measuring points.

Here, the focusing device 16 serves in the scanning microscope shown in FIG. 2 not to adjust several measuring planes. Its function comprises to adjust the focus with the surface of the object to be measured. The scanning microscope shown in FIG. 2 is therefore embodied as a confocal autofocus microscope, which is provided with a pinhole (not shown) in the radiation path of the microscope, which filters out non-focal radiation.

For this purpose, the scanner control unit 11 shown in FIG. 2 is provided with an autofocus system known per se, which controls the focusing device 16 such that for each measuring point the focus of the lens 5 is located on the surface of the object to be measured. Such an autofocus system is described for example in EP 1 610 088, which is incorporated by reference herein as if fully set forth.

In the scanning microscope shown in FIG. 2, the interferometer serves as a light source for the measuring process such that the laser beam of the interferometer serves as a measuring beam for determining the light intensity. The light source 1 and the camera 8 with the allocated optic components, first lens 2, first beam splitter 3 and second lens 7 are therefore not necessary for the measuring process per se, and can be omitted here. It is advantageous, though, when the user receives an optical image of the object 6 to be measured via the camera 8 using these components, so that for example the positioning of the measuring point on the object can be reviewed.

The invention claimed is:

1. A scanning microscope for the optic measuring of an object, comprising a lens, a light source, a displacement unit, and a scanner control unit, with the scanning microscope being adapted to emit a measuring beam from a light source that impinges the object to be measured and the measuring beam reflected by the object enters as a reflection beam through the lens into a radiation path of the microscope, and the scanner control unit with a displacement unit cooperate such that the scanner control unit controls the displacement unit via control signals such that a relative position of the object to be measured and the measuring beam are changed so that the measuring beam can be directed to at least two predetermined, locally different measuring points on the object, the scanning microscope further comprises a signal detector and a signal storage unit, with the signal detector being arranged in the radiation path of the scanning microscope such that the reflection beam is visualized on the signal detector and the signal storage unit is connected to the signal detector and is adapted to save a measuring sequence of signals of the signal detector, with the scanner control unit being connected to the signal control unit, controlling the signal storage unit such that at least one measuring sequence with two consecutive measuring signals of the signal detector are saved for each of the measuring points on the object without changing a relative position of the object to be measured and the measuring beam for the measurement of the at least two consecutive measurement signals of the measuring sequence.

2. A scanning microscope according to claim 1, wherein the scanner control unit comprises a synchronization input and is adapted to control the signal storage unit depending on a synchronization signal provided at a synchronization input such that the measurement sequence for each of the measuring points saved in the signal unit are approximately of the same phase as the synchronization signal.

3. A scanning microscope according to claim 1, wherein the scanner control unit cooperates with the signal storage unit, and the measuring sequence saved for each of the measuring points comprises at least a predetermined number of measuring signals of the signal detector.

4. A scanning microscope according to claim 1, wherein the scanner control unit cooperates with the signal control unit, and the measurement signals are saved at a predetermined scanning frequency for each of the measuring points for a predetermined period.

5. A scanning microscope according to claim 4, wherein the signal detector and the signal storage unit are adapted to save the measuring signals with a scanning frequency of at least 1 kHz.

6. A scanning microscope according to claim 1, wherein the microscope comprises an evaluation unit, which is connected to the signal control unit and is adapted to correlate the individual measuring sequences for the different measuring points to each other such that a speed and/or an amplitude of the movement is determined for the at least one measuring point.

7. A scanning microscope according to claim 1, wherein the scanning microscope comprises a confocal scanning microscope, having a spatial filter, which is arranged in the radiation path of the scanning microscope and essentially filters out non-focal beams, which enter the lens originating from points outside of a focus of the lens.

8. A scanning microscope according to claim 1, wherein the scanning microscope is additionally provided with a focusing device, which can change a distance between the object and a focal plane of the lens in reference to each other, with the focusing device being connected to the scanner control unit and the scanner control unit controlling the focusing device, the displacement unit, and the signal storage unit such that for each of the measuring points a measuring sequence of the measuring signals of the signal detector is saved for at least two predetermined distances between the object and a focus plane.

9. A scanning microscope according to claim 6, wherein the evaluation unit is embodied such that it correlates the individual measuring sequences for the different ones of the measuring points and for each distance between the object and the focus plane of the object with each other such that for the at least one measuring point, the speed and/or the amplitude of the movement is determined.

10. A scanning microscope according to claim 1, wherein the scanning microscope comprises an interferometer, which is arranged in the radiation path of the scanning microscope such that the measuring beam comprises an interferometer-measuring beam emitted by the interferometer that is visualized on the measuring point of the object via the lens and the interferometer measuring beam reflected by the object is then visualized in the interferometer as an interferometer-reflection beam again via the lens and the radiation path of the microscope, with the interferometer comprising an interferometer evaluation unit, which determines the movement of the object parallel to the interferometer measuring beam from interferometric measurement data and the interferometer evaluation unit is connected to the signal storage unit to save for each of the measurement points on the object, in addition to the measuring sequence of the measuring signals of the signal detector, the movement data for said measuring points determined via the interferometer evaluation unit.

11. A scanning microscope according to claim 10, wherein the interferometer comprises a heterodyne interferometer, in which two optic waves with different frequencies are interfered.

12. A scanning microscope according to claim 10, wherein the interferometer is the signal detector, with the measuring signal for the in-plane movement being yielded from an intensity of the interferometer measuring signal.

13. A scanning microscope according to claim 5, wherein the signal detector and the signal storage unit are adapted to save the measuring signals with a scanning frequency of at least 100 kHz.

* * * * *